United States Patent [19]

Konishi et al.

[11] Patent Number: 4,788,068
[45] Date of Patent: Nov. 29, 1988

[54] AEROSOL FOOD FLAVORING COMPOSITIONS

[75] Inventors: Gregory A. Konishi, Phoenix; Peter F. Davy, Scottsdale, both of Ariz.

[73] Assignee: The Dial Corporation, Phoenix, Ariz.

[21] Appl. No.: 929,249

[22] Filed: Nov. 10, 1986

[51] Int. Cl.$^4$ ............... B65D 83/14; A23L 1/035; A23D 5/00; A23D 3/04
[52] U.S. Cl. .................... 426/116; 426/601; 426/604
[58] Field of Search ............ 426/116, 601, 604

[56] References Cited

U.S. PATENT DOCUMENTS 2,849,323  9/1958  Young et al. ............ 426/116
4,279,941  7/1981  Bosco et al. ............ 426/604

FOREIGN PATENT DOCUMENTS 0011751  2/1981  Japan ............ 426/116
0183650  10/1984  Japan ............ 426/116

OTHER PUBLICATIONS

Herzka, A., Edible Products in Pressurized Dispensers, Chemistry and Industry, Jan. 7, 1956.
Food Chemistry, May 1966, p. 113, New Aerosol Formulations are Tested.
Modern Packaging, Nov. 1957, pp. 116-238.
Food Engineering, Sep. 1957, pp. 20-25.

Primary Examiner—Donald E. Czaja
Assistant Examiner—Helen Pratt
Attorney, Agent, or Firm—Richard G. Harrer; Bernard L. Howard

[57] ABSTRACT

A food flavoring composition in aerosol form comprising a major amount of concentrate and a minor amount of a suitable propellant. The concentrate contains from 50 to 75% food grade oil, from 5-50% undissolved solids, an emulsifier with a HLB value of from 7 to 12 and substantially no moisture. The flavored product can be sprayed onto various foods such as popcorn for the needed flavor enhancement.

9 Claims, No Drawings

AEROSOL FOOD FLAVORING COMPOSITIONS

BACKGROUND OF THE INVENTION

This invention relates generally to food sprays, and more particularly to flavor enhancing, aerosol packaged food sprays.

There is a need for flavor enhancing blends that can be easily applied to foods, as for example popcorn, that are shelf stable, and that consist of solid particles that cling to the food surfaces. Packaging of such blends in aerosol packages presents a number of problems. Among these are the difficulty of propelling solid particulates via aerosol valves and nozzles, and the tendency of moisture in combination with salt to produce electrolytic corrosion in the pressurized aerosol can.

OBJECTS OF THE INVENTION

It is a major object of the invention to provide a food spray having a high level of undissolved solids, and method of processing same for filling into an aerosol can, characterized as overcoming the above problems as well as others. It is another object of the invention to provide an improved flavor enhancing food spray, or sprays, wherein a high level of undissolved solid particles are dispensable from an aerosol package, and result in particles clinging to the food surface. In addition, the amount of flavor enhancing product required to be dispensed in this manner, and clinging to the food surface, is less than the amount of butter or cheese applicable by prior methods, for the same flavor enhancement effect.

It is another object of the invention to provide a sprayable vegetable oil and butter or cheese blend that contains small amounts of $SiO_2$ and emulsifiers for purposes as will appear.

It is yet another object of the invention to provide a process to achieve the sprayable blends containing undissolved solids, and characterized by substantially total absence of water, and including homogenization at extremely high pressure.

These and other objects and advantages of the invention, as well as the details of an illustrative embodiment, will be more fully understood from the following specification.

SUMMARY OF THE INVENTION

As will appear, the aerosol base concentrate, without propellant, and adapted for use as a food spray, comprises:

(a) between about 50 and 75 weight percent vegetable oil or oils, (b) between about 5 and 50 weight percent of undissolved solids such as butter, cheese powder, $SiO_2$, NaCl and the like, (c) and between about 0.2 and 12 weight percent of a combination of emulsifiers.

These ingredients are homogenized to an extent that substantially all ingredient particules are less than about 150 microns in size, so as to be capable of being dispensed from the aerosol package. The aerosol package containing the blend is also characterized as substantially moisture free and includes a major amount (as for example about 70%) by weight percent of base concentrate, and a minor amount (as for example about 30%) by weight of suitable liquified propellant, preferably a hydrocarbon.

DETAILED DESCRIPTION

The aerosol food flavoring composition of this invention is packaged in an aerosol container and comprises a suitable aerosol container, a base concentrate and a suitable (typically n-butane) propellant. Typically, the amount of base concentrate and propellant in the container are as follows:

|  | Low | High | Preferred |
|---|---|---|---|
| propellent | 15% | 85% | about 30% |
| concentrate | 15% | 85% | about 70% |

The composition in the aerosol container contains as little moisture as possible and preferably the weight percentage of moisture in the composition is below 1%. This very low level of moisture is important so as to prevent corrosion of the aerosol container, particularly if salt is present in the composition. Also, this low level of moisture contributes to shelf stability of the final product.

An important aspect of our invention is the use of a combination of a hydrophilic and lipophilic emulsifier for long-term stability of the composition. In the late 1940's Atlas Chemical Industries introduced the HLB system, the letters HLB standing for hydrophile-lipophile balance. It is generally understood that emulsifiers having an HLB of 9.0 and below are lipophilic (oil loving or non-polar) and those having an HLB of 11.0 and above are hydrophilic (water loving or polar). An emulsifier having an HLB in the 9-11 range is considered as intermediate.

When two or more emulsifiers are blended, the HLB of the blend can be easily calculated. For example, if one wants to determine the HLB of a blend of 70% of an emulsifier having an HLB of 15.0 and 30% of an emulsifier having an HLB of 4.3, the calculation would be:

| 70% × 15.0 (HLB) = | 10.5 |
|---|---|
| 30% × 4.3 (HLB) = | 1.3 |
| HLB of blend = | 11.8 |

The HLB is related to solubility. For example, an emulsifier having a low HLB tends to be oil soluble, whereas an emulsifier having a high HLB tends to be water soluble. It is generally thought that a "water soluble" emulsifier (high HLB) is used to make an oil/water emulsion or to solubilize oils. On the other hand, if a water/oil emulsion is desired or a non-aqueous emulsion system is desired, one would probably choose an oil soluble emulsifier (low HLB). Thus, generally speaking, the following are correlations between the uses of emulsifiers having differing HLB values.

| HLB RANGE | USE |
|---|---|
| 4-6 | Water/oil emulsifiers |
| 7-9 | Wetting agents |
| 8-18 | Oil/water emulsifiers |
| 13-15 | Detergents |
| 10-18 | Solubilizer |

We have found that in the composition of of our invention a combination of both a hydrophilic and lipophilic emulsifier is required to achieve the desired results. That is, even though the desired HLB value of a concentrate is, for example, lipophilic (below 9), a combination of lipophilic and hydrophilic emulsifier is needed.

In our initial investigation we found that lecithin having an HLB of 2-3, a lipophilic emulsifier, worked well as a viscosity control agent in the concentrate and also seemed to provide good sprayability of the composition. However, when the aerosol flavoring composition was held for longer periods of time, clumping of the solids in the concentrate took place and the sprayability of the composition was impaired. Unexpectedly, the addition of a hydrophilic emulsifier to the system along with the lipophilic material completely eliminated any clumping problem and resulted in a composition having excellent long term stability and sprayability.

Thus, the emulsifier system used in the base concentrate comprises a lipophilic emulsifier, preferably lecithin since it also controls viscosity, and a hydrophilic emulsifier and wherein the ultimate HLB value of the system ranges between about 7 and about 12.

It should also be noted that as the ratio of the concentrate to the propellant changes, the HLB value of the total composition in the aerosol container will change. Generally, an increase in the amount of propellant with a corresponding reduction in the amount of concentrate will necessitate an increase in the HLB value of the emulsifier system. For example, a concentrate containing cheese powder, vegetable oil, NaCl, emulsifier, artificial flavoring, and antioxident, when packaged with varying amounts of propellant (n-butane) should have an HLB value about as follows:

| % Concentrate | % Propellant | HLB |
|---|---|---|
| 80% | 20% | 9.8 |
| 70% | 30% | 10.8 |
| 60% | 40% | 10.8 |
| 50% | 50% | ·11.8 |

As previously noted, lecithin is incorporated into the base concentrate to control viscosity and as a lipophilic emulsifier. The amount of lipophilic emulsifier is dependent upon the amount of propellant present in the composition. As the amount of propellant is increased, the amount of lipophilic emulsifier required is reduced. Generally, from about 2.0% down to about 0.2% of such emulsifier is required.

The composition is characterized as having a high level of undissolved solids such as butter, cheese, salt, sugar and the like and essentially no water. It also includes vegetable oils, the emulsifier combination, a small amount of SiO₂, and most preferably a minor amount of an anti-oxidant such as TBHQ to prevent rancidness and further extend shelf life. Examples of typical compositions follow.

EXAMPLE I

Some typical base concentrate formulations are:

| | A % | B % | C % |
|---|---|---|---|
| Vegetable oil or oils | 54.5 | 62.4 | 57.7 |
| Butter powder | 28 | 16 | 5 |
| Cheese powder | — | 8 | — |
| SiO₂ | 2 | 1 | 1 |
| NaCl | 12 | 10 | 2 |
| Emulsifier | 2 | 1.0 | 1.4 |
| Sugar | — | — | 30 |

In this regard, the mixture also typically contains natural and artificial flavors, colors, and a minor amount of an anti-oxidant, such as TBHQ, to further ensure stability of the composition.

EXAMPLE II

A butter flavored concentrate according to formulation A of Example I is as follows:

| | lbs. |
|---|---|
| Partially Hydrogenated Vegetable Oil | 555.01 |
| Butter Blend | 420.00 |
| (67% spray dried butter, 28% NaCl, 5% SiO₂) | |
| Artificial flavors | 14.30 |
| Lecithin (HLB 2.5) | 5.00 |
| Polysorbate 60 (HLB 14.9) | 5.40 |
| TBHQ | 0.27 |
| Beta Carotene | 0.02 |

In the above, the TBHQ prevents rancidness, and extends shelf life.

In preparing the concentrate of this Example, the following processing steps were followed.
1. Introduce the vegetable oil into a blend tank.
2. Add emulsifier system.
3. Add artificial flavors to the blend tank.
4. Slowly add undissolved solids with high speed mixing to attain a uniform dispersion.
5. Add TBHQ and color to blend tank and mix.
6. Homogenize at 5,500–6,000 psi.
7. Fill into appropriate aerosol container.

EXAMPLE III

A cheese flavored concentrate according to formulation B of Example I is as follows.

| | lbs. |
|---|---|
| Partially Hydrogenated Vegetable Oil | 624.1 |
| Cheese Blend | 350.0 |
| (46% spray dried butter | |
| 29% NaCl | |
| 23% Spray Dried Cheddar cheese | |
| 2% SiO₂) | |
| Natural and Artificial Flavors | 14.7 |
| Lecithin (HLB = 2.5) | 5.0 |
| Polysorbate 20 (HLB = 16.7) | 5.0 |
| Oleoresin Paprika | 0.6 |
| TBHQ | 0.6 |

In the above, the Polysorbate 20 acts as the hydrophilic emulsifier.

EXAMPLE IV

A caramel flavored concentrate according to formulation C of Example I as follows:

| | lbs. |
|---|---|
| Partially Hydrogenated Vegetable Oil | 577.5 |
| Caramel blend (powder) | 380.0 |
| 79% Fondant sugar | |
| 13% Spray dried butter | |
| 5% salt | |
| 3% SiO₂ | |

| -continued | lbs. |
|---|---|
| Natural and Artificial Flavors | 22.0 |
| Polysorbate 65 | 10.0 |
| Artificial Color | 6.0 |
| Lecithin | 4.0 |
| TBHQ | 0.5 |

In the above butter and cheese concentrates, the amount of water in each should not exceed about 0.8%, by weight. The $SiO_2$ and lecithin function to reduce the viscosity of the mix, to facilitate spraying from the aerosol package.

A series of aerosol food sprays were prepared as follows:

EXAMPLE V

Butter Flavor

|  | % |
|---|---|
| Partially Hydrogenated Vegetable Oil | 38.537 |
| Butter Blend | 29.400 |
| Lecithin | 0.500 |
| Polysorbate 20 | 0.540 |
| Artificial Flavors | 1.001 |
| TBHQ | 0.019 |
| Beta Carotene | 0.003 |
| Propellant (n-Butane) | 30.000 |
|  | 100.000% |

EXAMPLE VI

Cheese Flavor

|  | % |
|---|---|
| Partially Hydrogenated Vegetable Oil | 43.687 |
| Cheese Blend | 24.500 |
| Natural and Artificial Flavors | 1.029 |
| Lecithin (HLB 2.5) | 0.350 |
| Polysorbate 20 (HLB 16.7) | 0.350 |
| Oleoresin Paprika | 0.042 |
| TBHQ | 0.042 |
| Propellant (n-Butane) | 30.000 |
|  | 100.000% |

EXAMPLE VII

Caramel Flavor

|  | % |
|---|---|
| Partially Hydrogenated Vegetable Oil | 40.425 |
| Caramel Blend | 26.600 |
| Natural and Artificial Flavors | 1.540 |
| Polysorbate 65 (HLB 10.5) | 0.700 |
| Artificial Color | 0.420 |
| Lecithin (HLB 2.5) | 0.280 |
| TBHQ | 0.035 |
| Propellant (n-Butane) | 30.000 |
|  | 100.000% |

Testing of the compositions of Examples I-VII above after a period of one year showed good shelf life with respect to flavor, apperance and sprayability.

We claim:

1. An aerosol food flavoring composition comprising a major amount of a concentrate and a minor amount of suitable propellant, and wherein said concentrate comprises from about 50 to 75 weight percent of a food grade oil, from about 5 to 50 weight percent of undissolved solids, substantially no moisture, and from about 0.2 to 12 weight percent of an emulsifier system comprising a blend of a lipophilic and hydrophilic emulsifier, and wherein the HLB value of said system ranges from about 7 to 12.

2. The composition of claim 1 wherein said concentrate comprises at least 15% of said composition and said lipophilic emulsifier is lecithin having an HLB of from 2-3.

3. The composition of claim 1 wherein the amount of the emulsifier system is from about 1 to about 2% by weight of the concentrate.

4. The composition of claim 1 wherein the amount of concentrate ranges from at least about 50% to about 85% by weight of the composition.

5. The composition of claim 1 wherein the emulsifier system comprises a lipophilic emulsifier having an HLB of less than 9 and a hydrophilic emulsifier having an HLB of 11 and above.

6. The composition of claim 1 wherein the amount of moisture is less than about 1% of the composition.

7. The composition of claim 1 wherein the amount of undissolved solids ranges from 15 to 43% by weight.

8. The composition of claim 7 wherein the amount of undissolved solids ranges from 25-32% by weight.

9. The composition of claim 1 containing up to 15% by weight of sodium chloride as part of the undissolved solids.

* * * * *